(12) United States Patent
Vaidya

(10) Patent No.: US 12,210,544 B1
(45) Date of Patent: *Jan. 28, 2025

(54) CLOUD REPLICATION BASED ON ADAPTIVE QUALITY OF SERVICE

(71) Applicant: Veritas Technologies LLC, Santa Clara, CA (US)

(72) Inventor: Anish A. Vaidya, Pleasanton, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 17/152,095

(22) Filed: Jan. 19, 2021

Related U.S. Application Data

(63) Continuation of application No. 15/252,487, filed on Aug. 31, 2016, now Pat. No. 10,929,424.

(51) Int. Cl.
  *G06F 16/27* (2019.01)
  *G06F 9/455* (2018.01)
  *G06F 9/48* (2006.01)
  *H04L 67/1095* (2022.01)

(52) U.S. Cl.
  CPC .......... *G06F 16/27* (2019.01); *G06F 9/45558* (2013.01); *G06F 9/4881* (2013.01); *H04L 67/1095* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 9,100,343 B1* | 8/2015 | Riordan | H04L 41/40 |
| 9,442,748 B2* | 9/2016 | Burshan | G06F 11/1451 |
| 9,465,855 B2* | 10/2016 | Bourbonnais | G06F 11/203 |
| 9,965,306 B1* | 5/2018 | Natanzon | G06F 11/1471 |
| 10,120,767 B2* | 11/2018 | Cherryholmes | G06F 11/1471 |
| 10,185,758 B1* | 1/2019 | Ayzenberg | G06F 15/17331 |
| 2008/0049775 A1* | 2/2008 | Morrill | H04L 41/5003 370/419 |
| 2008/0082591 A1* | 4/2008 | Ahal | G06F 11/1471 |
| 2008/0177963 A1* | 7/2008 | Rogers | H04L 69/40 711/E12.103 |
| 2010/0185583 A1* | 7/2010 | Berinde | G06F 11/1461 707/610 |
| 2011/0004586 A1* | 1/2011 | Cherryholmes | G06F 11/1471 707/682 |
| 2012/0078848 A1* | 3/2012 | Jennas, II | G06F 16/1844 707/649 |
| 2012/0137173 A1* | 5/2012 | Burshan | G06F 9/45533 714/15 |

(Continued)

*Primary Examiner* — Mark D Featherstone
*Assistant Examiner* — Navneet Gmahl
(74) *Attorney, Agent, or Firm* — Campbell Stephenson LLP

(57) ABSTRACT

Disclosed herein are methods, systems, and processes to perform cloud replication based on adaptive Quality of Service. A replication stream is monitored over a period of time. The replication stream includes write operations issued by an application, and is associated with preset parameters. Replication parameters applicable to the replication stream are determined. The replication parameters are configured to be used in a replication operation. The preset parameters and the replication parameters are stored.

13 Claims, 12 Drawing Sheets

(56) References Cited

U.S. PATENT DOCUMENTS

| | | | |
|---|---|---|---|
| 2012/0239893 A1* | 9/2012 | Jennas, II | G06F 11/2064 |
| | | | 711/E12.103 |
| 2015/0081893 A1* | 3/2015 | Chadwell | G06F 3/067 |
| | | | 709/224 |
| 2015/0234617 A1* | 8/2015 | Li | G06F 3/0617 |
| | | | 711/114 |
| 2015/0293817 A1* | 10/2015 | Subramanian | G06F 16/184 |
| | | | 707/645 |
| 2016/0026535 A1* | 1/2016 | Bhat | G06F 11/2048 |
| | | | 714/19 |
| 2016/0048408 A1* | 2/2016 | Madhu | H04L 47/783 |
| | | | 718/1 |
| 2016/0048427 A1* | 2/2016 | Sasi | G06F 11/1464 |
| | | | 707/646 |
| 2017/0010941 A1* | 1/2017 | Shimada | G06F 11/1464 |
| 2017/0103114 A1* | 4/2017 | Miller | H04L 67/1095 |
| 2017/0169087 A1* | 6/2017 | Kapadia | G06F 11/2097 |
| 2017/0220424 A1* | 8/2017 | Doshi | H04L 41/5019 |
| 2017/0329677 A1* | 11/2017 | Crofton | G06F 16/2455 |
| 2018/0060182 A1* | 3/2018 | Rao Kotha, Kotha et al. | |
| | | | G06F 11/1464 |
| 2018/0095839 A1* | 4/2018 | Binford | G06F 11/1451 |
| 2020/0034718 A1* | 1/2020 | Beedu | G06F 3/0653 |
| 2020/0192767 A1* | 6/2020 | Savino | H04L 67/1097 |
| 2022/0035714 A1* | 2/2022 | Schultz | G06F 11/1438 |
| 2022/0318264 A1* | 10/2022 | Jain | H04L 67/1095 |

\* cited by examiner

| Replication Stream Portion Field 310 | Workload Priority Field 315 | RPO Limit Field 320 | I/O Rate Field 325 | Write Cancellation Field 330 | Deduplication Ratio Field 335 | Compression Ratio Field 340 | Workload Profile Field 345 | Replication Adjustment Field 350 |
|---|---|---|---|---|---|---|---|---|
| Replication Stream Portion 125(1) | P1 | 25% | 50 mb/s | 1.25 | 1 | 1.66 | A | Decrease |
| Replication Stream Portion 125(2) | P2 | 50% | 25 mb/s | 2.5 | 2.5 | 1 | B | Increase |
| Replication Stream Portion 125(3) | P3 | 75% | 10 mb/s | 3 | 1.5 | 0.5 | B | Increase |
| ... | ... | ... | ... | ... | ... | ... | ... | ... |
| Replication Stream Portion 125(N) | P3 | 75% | 100 mb/s | 0.75 | 1 | 2.5 | A | Decrease |

Replication Interval Adjustment Table 305

CLOUD REPLICATION BASED ON ADAPTIVE QUALITY OF SERVICE

CROSS-REFERENCE TO RELATED APPLICATIONS

The present patent application is a continuation of U.S. patent application Ser. No. 15/252,487, filed on Aug. 31, 2016, entitled "Cloud Replication Based On Adaptive Quality of Service", which is incorporated by reference herein in their entirety and for all purposes, as if completely and fully set forth herein.

FIELD OF THE DISCLOSURE

This disclosure relates to data replication. In particular, this disclosure relates to providing adaptive quality of service for cloud-based data replication.

DESCRIPTION OF THE RELATED ART

Companies, businesses, organizations, and/or individuals use public or private "cloud" data storage services for storing and securing critical data. A cloud is a data center that provides data storage services by securely storing customer data in a remote location, from which the data can be recovered at a later time, if needed. Storing data in the cloud requires data to be replicated to the cloud.

Data replication involves copying data from one location to another, typically remote location, over a Wide Area Network (WAN). Therefore, data replication incurs networking costs in terms of financial expenses associated with provisioning the required networking resources. For example, financial costs associated with WAN bandwidth, which can be significant, are based not only on the amount of data that is transferred over the WAN, but also on when that data is transferred (or replicated to the cloud).

In addition to financial costs associated with replicating data to the cloud over a network, each application whose data is being replicated to the cloud may have different data transfer needs, and hence a different priority. For example, a highly critical application implemented to provide online banking services may require application data to be replicated to the cloud multiple times within a given time span for disaster recovery purposes. Therefore, data replication to the cloud over a WAN demands efficient and resourceful use of expensive and finite networking resources.

SUMMARY OF THE DISCLOSURE

Disclosed herein are methods, systems, and processes to perform cloud-based data replication by providing adaptive quality of service for replication streams based on priority and dynamic application workload profiles. One such method involves monitoring a replication stream over a period of time. The replication stream includes write operations issued by an application, and is associated with preset parameters. The method determines replication parameters applicable to the replication stream that are configured to be used in a replication operation. The method stores the preset parameters and the replication parameters for use in the replication operation.

In one embodiment, the preset parameters include a recovery point objective (RPO) limit, and the replication parameters include an input/output (I/O) rate, a write-cancellation ratio, a deduplication ratio, and/or a compression ratio. In another embodiment, the method performs a replication operation by adjusting a replication interval of the replication stream based on the replication parameters (e.g., by generating an adjusted replication interval), and sends an update set of the replication stream according to the adjusted replication interval. In some embodiments, performing the replication operation also includes limiting the adjusted replication interval according to the RPO limit.

In certain embodiments, the replication stream is received from several virtual machines via an I/O tap. The virtual machines execute various applications, including the application that issues the write operations. Each application is assigned a workload priority. In certain other embodiments, the RPO limit comprises an upper limit and a lower limit, and is based on the workload priority assigned to each application.

In some embodiments, the method accesses a workload profile of a virtual machine. In this example, the method determines the write cancellation ratio and the deduplication ratio of the workload profile, and assigns a weighted average to the workload profile based on the write cancellation ratio and the deduplication ratio of the workload profile.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a replication interval adjustment table, according to one embodiment of the present disclosure.

Figure 1A:
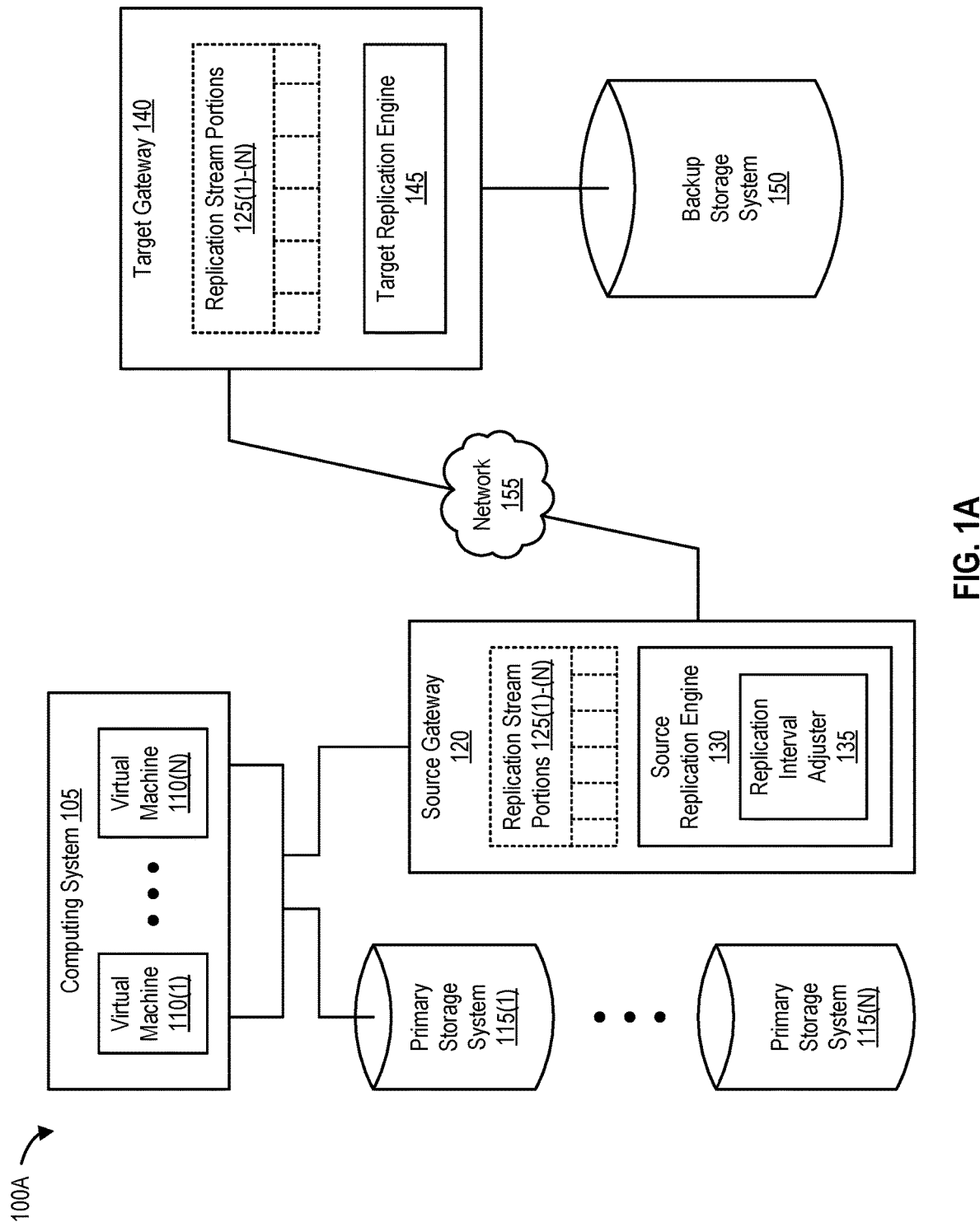
FIG. 1A is a block diagram of a cloud replication system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Companies, businesses, organizations, and individuals use private or public cloud services for disaster recovery purposes, and leverage "Disaster Recovery as a Service" (DRaaS) solutions. DRaaS permits copying and/or moving of data from on-premises workloads to the cloud such that in case of a disaster, application(s) can be started in the cloud using the latest copy of the data. Enterprise customers who utilize DRaaS solutions also typically have requirements associated with Recovery Point Objective (RPO) and platform support.

An RPO is typically defined by business continuity planning. An RPO is the maximum targeted period in which data might be lost from an Information Technology (IT) service, for example, due to a disaster. For instance, if an RPO is 10 minutes, then an application that requires backed up data can continue functioning or executing for a maximum of 10 minutes before that backed up data has to be recovered and provided to the application. If not, the application could fail. Therefore, in this scenario, it is prudent to replicate or back up the application's data at least once every 10 minutes, at the minimum. In some cases, an RPO limit represents a percentage of the RPO value. For example, if an RPO limit is 50% for an RPO of 10 minutes, then data is backed up or replicated twice within the 10 minute RPO time period. Higher priority applications have lower RPO limits (ensuring that data is replicated multiple times during the RPO interval), and lower priority applications have higher RPO limits (ensuring that data is replicated at least once during the RPO interval).

It will be appreciated that the methods, systems, and processes described herein can support various storage topologies such as Direct-Attached Storage (DAS), Storage Area Network (SAN), Network Attached Storage (NAS), and the like. The methods, systems, and processes described herein can also permit the migration and/or failover of a workload across potentially heterogeneous virtualization platforms, and are agnostic to the underlying cloud platform. Therefore, the methods, systems, and processes described herein provide a hypervisor-agnostic and heterogeneous cloud replication solution, both on-premises, and on the cloud.

Although the methods, systems, processes described herein can be configured to be compatible with a high availability stack, the presence of such a stack is not a requirement. The methods, systems, and processes described herein can be implemented independently of such a high availability stack, and can be configured to be compatible with a native stack as well. The methods, systems, and processes described herein may not require storage reconfiguration on-premises, and may not assume direct access to primary storage. The methods, systems, and processes described herein can be configured to be compatible with combined or separate boot and data disks, and can replicate entire virtual machines (including the boot disk), or certain user selected volumes/disks which host application data. Finally, it will be appreciated that the methods, systems, and processes described herein can prioritize data transfer based on application and/or virtual machine priority, and can thus provide quality of service and maintain data integrity for cloud replication purposes.

In one or more embodiments, the methods, systems, and processes described herein can be implemented at array level, host level, or application level. The replication operation(s) described herein can be asynchronous, synchronous, periodic, and/or continuous. The granularity of the replication operation(s) described herein can be at Logical Unit Number (LUN) level, block level, file level, or application log level.

Although the replication operation(s) described herein can be performed continuously or periodically, in some embodiments, a hybrid approach can be implemented where virtual machine or host data can be tapped continuously and sent periodically to the cloud. For example, a kernel component in the virtual machine or host can monitor and capture input/output (I/O) operations such as read operations and write operations, and an aggregator on-premises can act as a staging server (e.g., a source gateway or a replication gateway). The captured I/O operations can be stored locally on primary storage devices and/or primary storage systems, for example, to service read and write requests from applications. In addition, the aggregator can aggregate and batch data from multiple workloads and perform data optimization (e.g., write cancellation and compression), before sending the data (e.g., captured write operation(s)) to the cloud. A cloud gateway can then receive this data in the cloud.

As previously noted, data replication to the cloud, for example over a Wide Area Network (WAN), demands efficient and resourceful use of expensive and finite networking resources. In addition to how much data to send, the decision of when to send (or replicate) data over a network to the cloud can be of utmost importance in the cloud replication scenario. Disclosed herein are the methods, systems, and processes to perform cloud-based data replication by providing adaptive quality of service for replication streams based on priority and dynamic application workload profiles.

An Example Cloud Replication System

FIG. 1A is a block diagram of a cloud replication system, according to one embodiment. The cloud replication of system of FIG. 1A includes a computing system 105 that implements virtual machines 110(1)-(N). Computing system 105 can be any type of computing system including a server, a desktop, a laptop, a tablet, and the like. Virtual machines 110(1)-(N) implemented by computing system 105 are communicatively coupled to primary storage systems 115(1)-(N) and source gateway 120. Primary storage systems 115(1)-(N) can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices. In one embodiment, primary storage systems 115(1)-(N) are local (e.g., on-premises) storage devices for virtual machines 110(1)-(N) (e.g., to store virtual machine data and/or application data).

Computing system 105, virtual machines 110(1)-(N), primary storage systems 115(1)-(N), and source gateway 120 can be integrated or separate. If separate, for example, computing system 105, virtual machines 110(1)-(N), primary storage systems 115(1)-(N), and source gateway 120 can be coupled by a local connection (e.g., using a technology such as Bluetooth™, Peripheral Component Interconnect (PCI), Small Computer System Interface (SCSI), or the like) or via one or more networks such as the Internet, a local area network (LAN), or a storage area network (SAN).

Source gateway 120 is a computing system that can perform replication to the cloud based on an adjusted replication interval, according to one embodiment. Source gateway 120 can be any type of computing system including a server, a desktop, a laptop, a tablet, and the like. Source gateway 120 receives replication stream portions 125(1)-(N) from virtual machines 110(1)-(N), and includes a source replication engine 130. Source replication engine 130 implements a replication interval adjuster 135.

As shown in FIG. 1A, source gateway 120 is communicatively coupled to target gateway 140 via network 155. In one embodiment, network 155 is a Wide Area Network (WAN). However, any type of network and/or interconnection other than network 155 (e.g., the Internet) can be used to facilitate communication between source gateway 120 and target gateway 140, and like source gateway 120, target gateway 140 can be any type of computing system including a server, a desktop, a laptop, a tablet, and the like.

Target gateway 140 receives replication stream portions 125(1)-(N) from source gateway 140 and also implements a target replication engine 145. Target gateway 140 is communicatively coupled to backup storage system 150. In one embodiment, backup storage system 150 can be a cloud storage device and/or system. However, backup storage system 150 can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices.

Figure 1B:
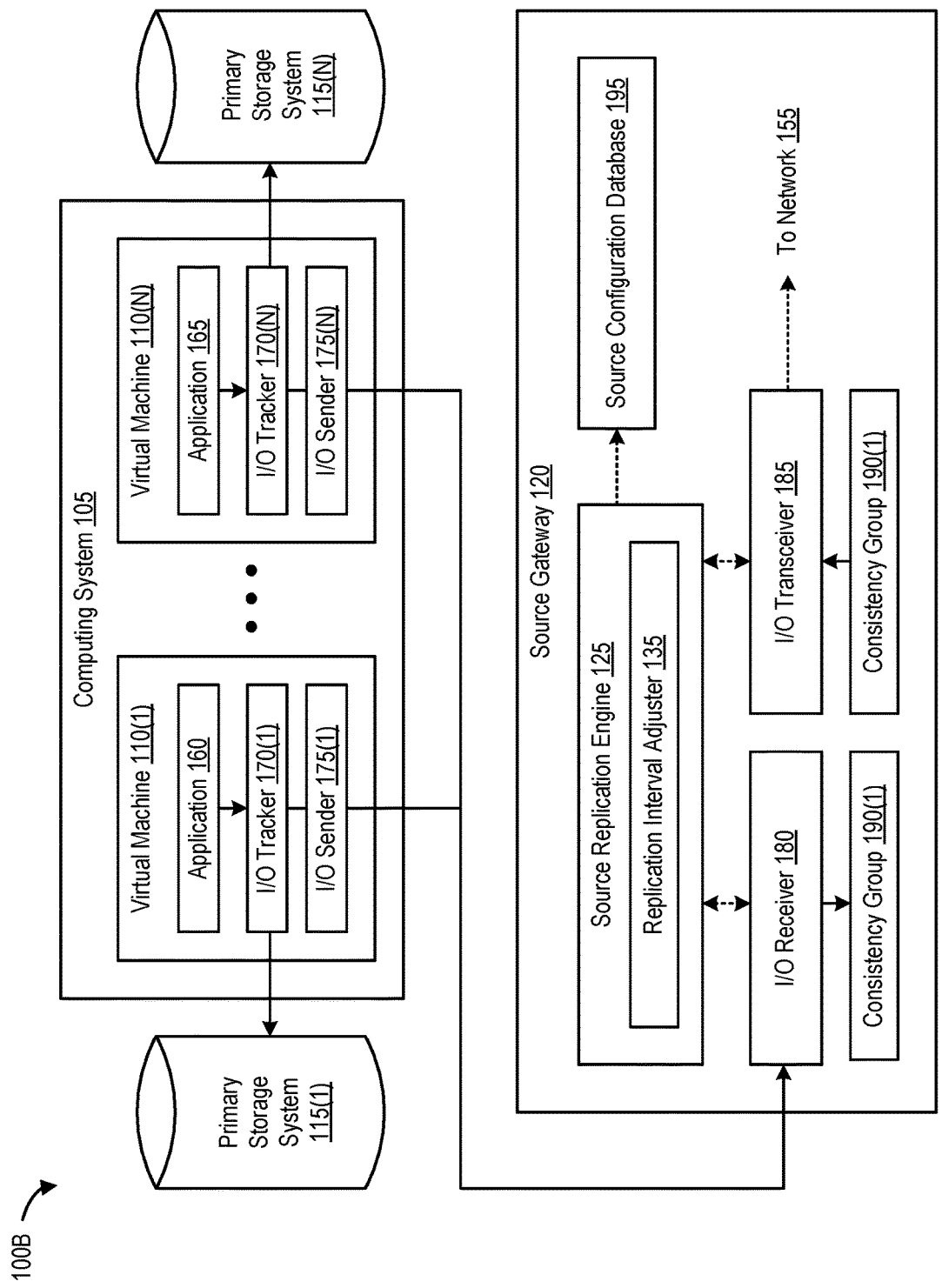
FIG. 1B is a block diagram of a computing system that provides adaptive quality of service for replication streams, according to one embodiment of the present disclosure.

FIG. 1B is a block diagram of a computing system that provides adaptive quality of service for replication streams, according to one embodiment. As shown in FIG. 1B, computing system 105 includes virtual machine 110(1) which is coupled to primary storage 115(1). Virtual machine 110(1) executes application 160 and includes an I/O tracker 170(1) and an I/O sender 175(1). Similarly, virtual machine 110(N) executes application 165 and includes an I/O tracker 170(2) and an I/O sender 175(2).

In some embodiments, I/O trackers 170(1) and 170(2) are host or virtual machine components running within an operating system (OS) kernel (e.g., a kernel driver) that intercepts block level I/Os issued by applications 160 and 165, a file system, or an OS, before the I/Os are sent to a storage subsystem (e.g., primary storage systems 115(1) and 115(N), respectively). In this example, the I/Os generated by applications 160 and 165 are copied in memory and sent and/or transmitted asynchronously to source gateway 120. Asynchronously transmittal ensures that I/Os generated by applications 160 and 165 are not blocked until the data is sent to source gateway 120 by I/O senders 175(1) and 175(2).

In some embodiments, I/O senders 175(1) and 175(2) can be implemented separately from I/O trackers 170(1) and 170(N) (e.g., as shown in FIG. 1B). However, in other embodiments, I/O senders 175(1) and 175(2) can be implemented as part of (or within) I/O trackers 170(1) and 170(N). In certain embodiments and examples, I/O trackers 170(1)-(N) are also referred to herein as "I/O Taps."

In order to recover after a fault (e.g., a virtual machine crash or a network disconnect with source gateway 120), I/O trackers 170(1)-(N) each maintain a log on primary storage systems 115(1)-(N), respectively (e.g., a "Dirty Region Log" (DRL)). This log can be used to track storage regions of primary storage systems 115(1)-(N) that are yet to be replicated (or sent) to source gateway 120. In some embodiments, the log can be implemented as a bitmap, where each bit maps to a 64 KB region on storage, for example, to exploit the spatial and temporal locality of a given application workload.

A log bit is set is a 512 byte block is updated in a storage region of primary storage systems 115(1)-(N). This bit is synchronously set on primary storage systems 115(1)-(N) before an application I/O is complete. If another block in the same storage region is updated next, the bit need not be set again. After recovering from fault or flow control, I/O trackers 170(1)-(N) read the log bitmap and identify the storage regions that need to be replicated from primary storage systems 115(1)-(N). I/O trackers 170(1)-(N) then read those storage regions and send data from those storage regions to source gateway 120.

Given that I/O trackers 170(1)-(N) intercept block level I/Os, I/O trackers 170(1)-(N) can be configured to work at an individual disk level or at a volume level (e.g., a logical collection of disks). Virtual machines 110(1)-(N) or applications 160 and/or 165 may write to multiple disks or volumes. Therefore, in some embodiments, data is sent and applied in the order in which the data was generated by applications 160 and/or 165 across these replication units to avoid data corruption. I/O trackers 170(1)-(N) can also sequence I/Os generated by applications 160 and/or 165 for multiple replication units. In the present disclosure, a collection of related replication units is referred to herein as a "Consistency Group" (e.g., consistency group 190(1) as shown in FIG. 1B). I/O trackers 170(1)-(N) send this consolidated stream of I/O packets related to a consistency group on a continuous basis to source gateway 120.

Source gateway 120, as shown in FIG. 1B, acts as an aggregator of I/Os from multiple virtual machines. In certain embodiments, source gateway 120 can be configured to perform, provide, and/or facilitate one or more of the following: data optimization (e.g., write cancellation, compression, and data deduplication), single compute footprint in the cloud during normal operation (e.g., which facilitates a near dark disaster recovery), adaptive quality of service (QOS) based replication according to priorities of virtual machines and/or applications, minimal and confined network changes (e.g., related to ports and firewalls), and post processing including copy data management. In addition, data from on-premises (e.g., from source gateway 120) can be replicated to multiple clouds and/or destination data centers without requiring additional overhead on the virtual machines.

It will be appreciated that block level replication can provide a platform agnostic method of collecting and applying I/Os to cloud storage. Thus, target gateway 140 in the cloud can server multiple disparate workloads on-premises. It will also be appreciated that tapping I/Os at the volume level (e.g., instead of only at the disk level) can result in lesser data being sent over a network (e.g., a WAN) to the cloud, for example, in case of mirrored volumes. However, in some embodiments, I/Os can be tapped or captured at both the block level and/or at the volume level, depending on the configuration of a given storage system.

As shown in FIG. 1B, source gateway 120 includes a source replication engine 125, which further implements a replication interval adjuster 135. Source gateway 120 also includes an I/O receiver 180, an I/O transceiver 185, and a source configuration database 195. As previously noted, consistency group 190(1) is a collection of related replication units. Also as noted, I/O Taps can sequence I/Os generated by applications 160 and/or 165 for multiple such replication units. A consolidated stream of I/O packets related to consistency group 190(1) is sent by I/O taps (or by I/O senders 175(1) and 175(2)) to source gateway 120 (e.g., via I/O receiver 180). As shown in FIG. 1B, source gateway 120 then sends this consistency group 190(1) to target gateway 140 via network 155 (e.g., via I/O transceiver 185).

Figure 2A:
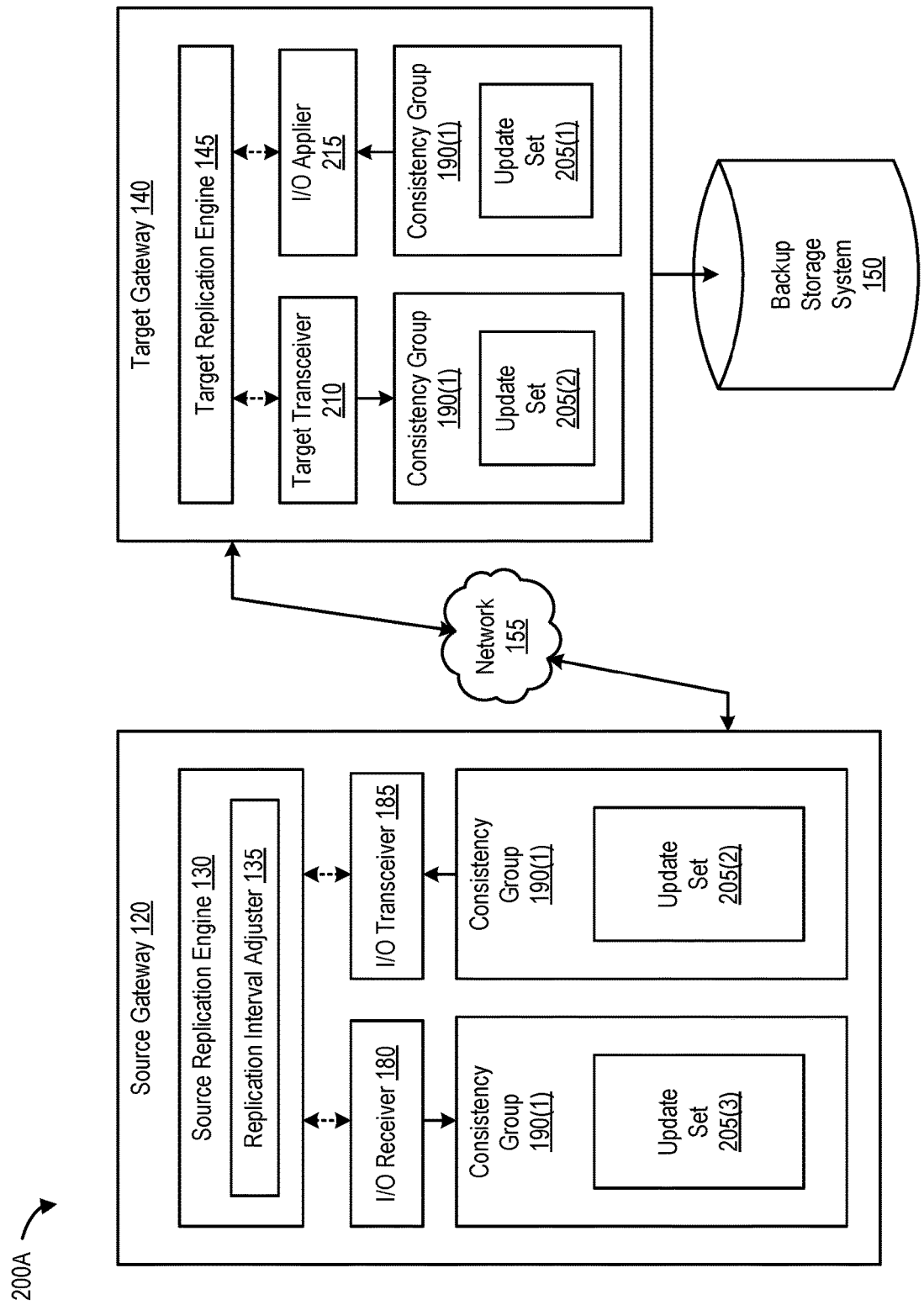
FIG. 2A is a block diagram of a computing system that performs replication based on adjusted replication interval (s), according to one embodiment of the present disclosure.

FIG. 2A is a block diagram of a computing system that performs replication based on adjusted replication interval (s), according to one embodiment. As shown in FIG. 2A, source gateway 120 includes source replication engine 130, which further implements replication interval adjuster 130. I/O receiver 180 collects I/Os from various virtual machines (related to different consistency groups) and stores these I/Os in files. In doing so, I/O receiver 180 also buckets these I/Os and performs write cancellation. Write cancellation prevents multiple write operations to a given block by cancelling earlier write operations when later write operations are to be performed on a given block, before the earlier writes are committed.

For example, if the same block was re-written by application 160 or application 165, the block is overwritten in the bucket. In some embodiments, a bucket can be referred to as an "Update Set." In these embodiments, an update set is semantically similar to an incremental snapshot, and is a collection of files where one file corresponds to a replication unit in a consistency group. I/O receiver 180 can thus convert a continuous stream of I/Os into a bucket that can then be periodically sent to target gateway 140 (e.g., by I/O transceiver 185), and applied on the destination volume (e.g., in backup storage system 150) by I/O applier 215 in conjunction with target replication engine 145 (e.g., after first being received by target transceiver 210). It will be appreciated that as long as an entire update set (e.g., update sets 205(1)-(3)) is applied in an atomic fashion, data consistency can be maintained.

Figure 2B:
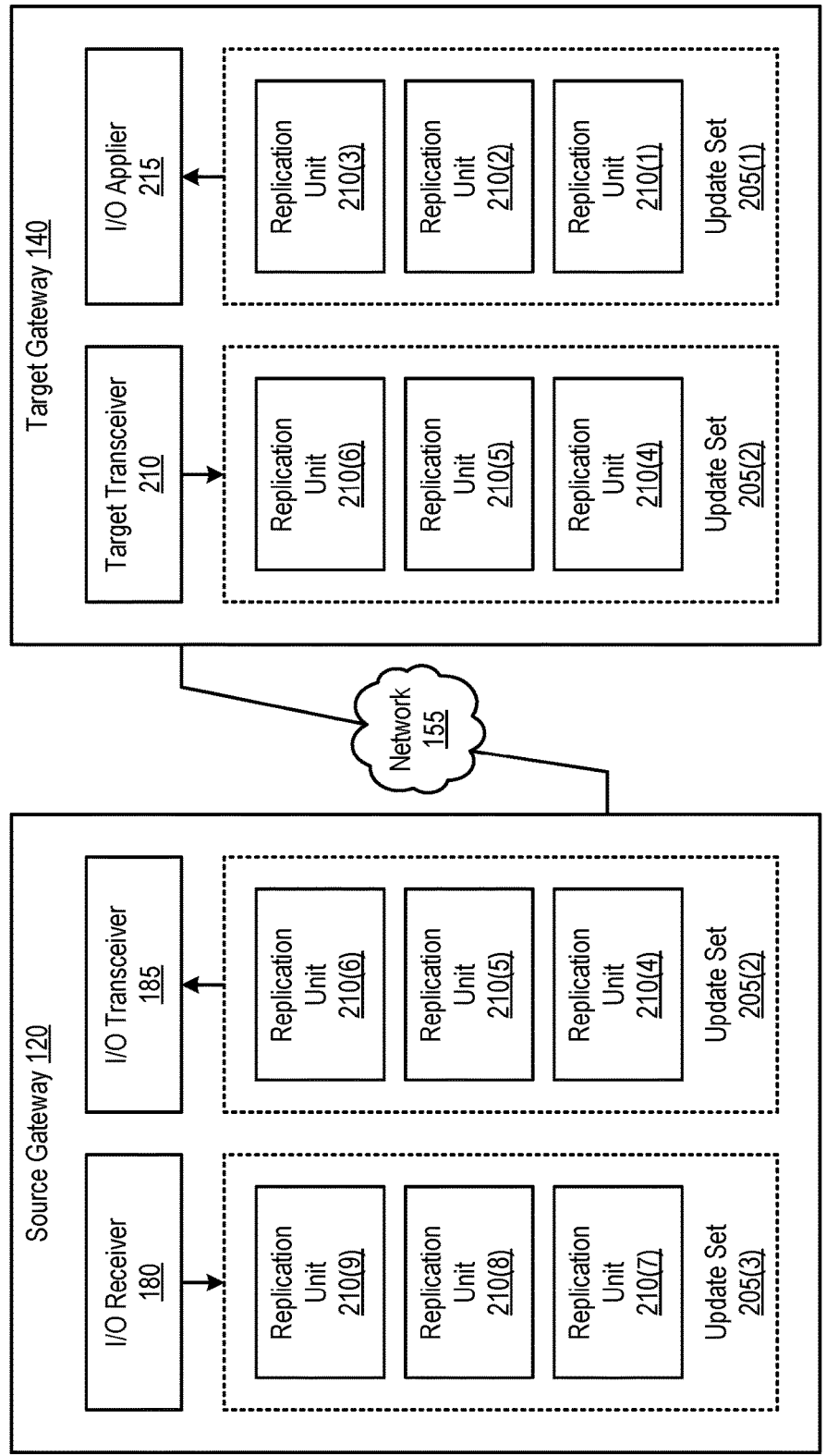
FIG. 2B is a block diagram of a computing system that replicates interval adjusted update sets to the cloud, according to one embodiment of the present disclosure.

FIG. 2B is a block diagram of a computing system that replicates interval adjusted update sets to the cloud, according to one embodiment. In some embodiments, I/O receiver 180 is a daemon (e.g., running as server), and accepts I/Os from multiple virtual machines (e.g., virtual machines 110 (1)-(N) (e.g., over a network). I/O receiver 180 stores the continuous stream of I/Os generated by a virtual machine/ application in files (e.g., one file per replication unit). As noted, I/O receiver 180 can also provide write cancellation where if the same logical block is modified multiple times resulting in many copies being received from the I/O Taps, the file written by I/O receiver 180 will only have a single copy of that logical block. Along with data files, as noted above, I/O receiver 180 also maintains metadata files that contain the mapping of logical block numbers (e.g., as seen by applications 160 and 165) with the physical block numbers in the update set files (e.g., after write cancellation).

Therefore, in the above example, and as noted, a set of files (or other unit of data, for example, such as a block, a data segment, and the like) created in this manner is called an update set (e.g., update sets 205(1)-(3)). Also as noted, semantically, an update set is similar to an incremental storage snapshot. After an update set is full (e.g., based on the allocated file sizes), or if a pre-determined amount of time has elapsed after which data needs to be sent to the cloud (e.g., to maintain an RPO requirement), I/O receiver 180 hands update set(s) over to source replication engine 130 (e.g., as shown in FIGS. 1B and 2A). In turn, I/O receiver 180 receives another set of files (or units of data) to continue writing data sent by the I/O Taps. As previously noted, and in the foregoing example, the I/O Taps refer to one or more I/O trackers (e.g., I/O trackers 170(1)-(N) as shown in FIG. 1B).

In some embodiments, if I/O receiver 180 cannot get the next set of files or unit(s) of data (e.g., because of a network disconnect between source and target gateways, or some other failure be it hardware or software), I/O receiver 180 issues a flow control to the I/O Tap(s). This flow control command transitions the I/O Tap(s) to a log tracking mode where the I/O Tap(s) keep intercepting (and capturing) application I/Os, but do not send or transmit the I/Os to I/O receiver 180 until the flow control (command) is reset (e.g., after the network disconnect or failure is rectified).

When instructed by source replication engine 130, I/O transceiver 185 on source gateway 120 reads an update set for a consistency group (e.g., update set 205(2) for consistency group 190(1)). At the point in time, I/O receiver 180 has finished its job of writing to the update set and the update set is ready for delivery (e.g., to be replicated to the cloud). This mechanism avoids any locking between I/O receiver 180 and I/O transceiver 185. I/O transceiver 185 then sends the update set (e.g., over network 155) to target transceiver 210 in target gateway 140. If there is a network disconnect followed by a reconnect between source gateway 120 and target gateway 140, I/O transceiver 185 resumes from the point before the network disconnect, and sends the remaining portion of the update set to target transceiver 210.

Target transceiver 210 on target gateway 140 receives the update set and stores the update set in corresponding files (e.g., based on replication units). Once an entire update set is received from I/O transceiver 185, target transceiver 210 instructs target replication engine 145 on target gateway 120 to further instruct I/O applier 215 to read the update set, and apply the update set to a data volume on backup storage system 150. I/O applier 215, which can be a daemon, when instructed by target replication engine 145, reads the update set written by target transceiver 210, and applies I/Os based on the metadata (e.g., the logical block number) to one or more data volumes on backup storage system 150.

In some embodiments, if I/Os are tapped (e.g., intercepted or otherwise captured) by the I/O Tap(s) (e.g., I/O trackers 175(1)-(N)) at volume level, I/O applier 215 adds the volume metadata offset before writing to the data volume(s) on backup storage system 150. However, in other embodiments, if I/Os are tapped (e.g., intercepted or otherwise captured) by the I/O Tap(s) (e.g., I/O trackers 175(1)-(N)) at disk level, there is no need to add the offset related to volume metadata, because the volume metadata is also captured and sent to the cloud (e.g., to target gateway 140). In one embodiment, and although not strictly required, the number of data volumes and the size of these data volumes on backup storage system 150 matches the number and the size of replication units (e.g., replication units 210(1)-(10)) in a given consistency group (e.g., consistency group 190(1)).

An Example Replication Interval Adjuster

Figure 2C:
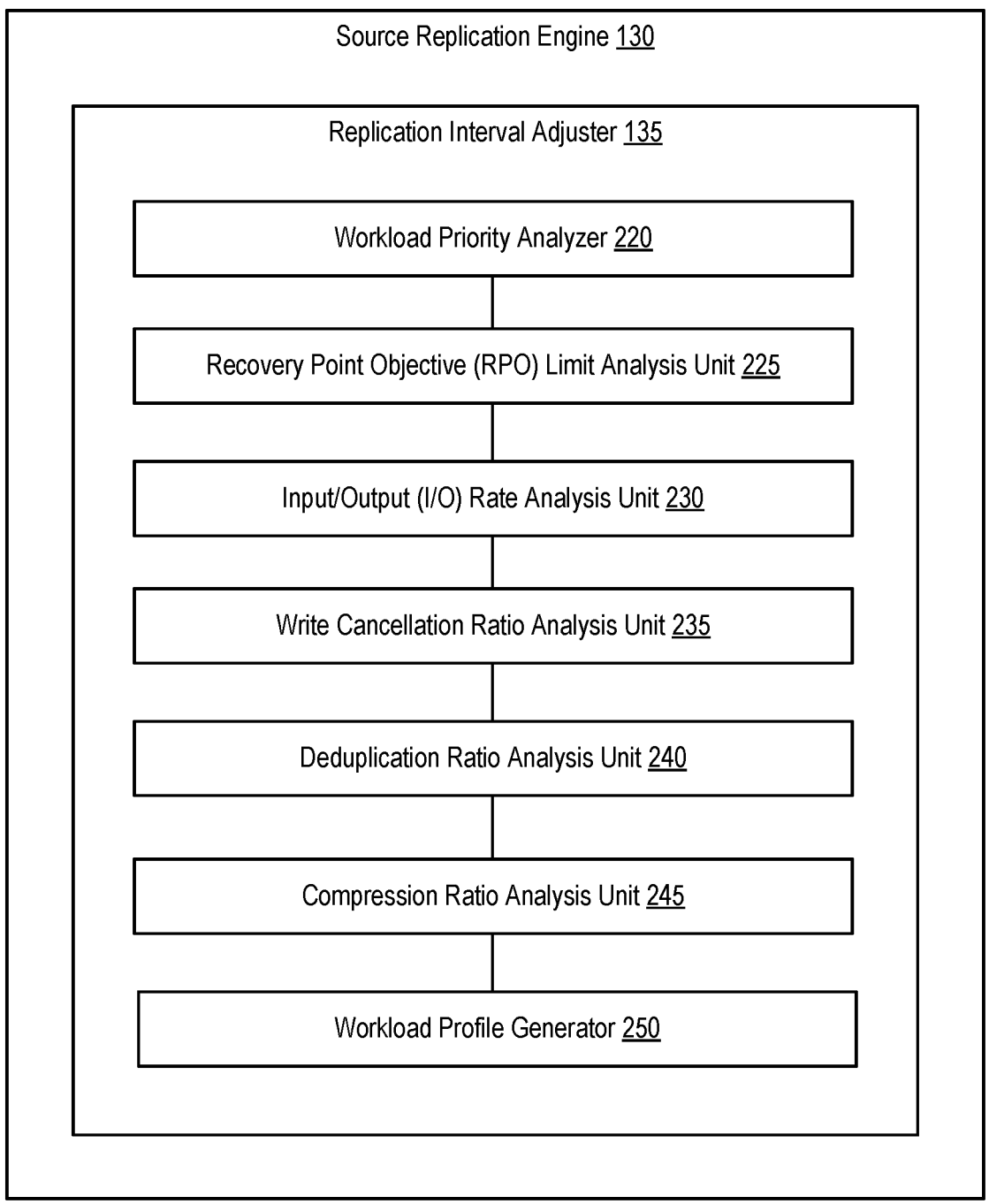
FIG. 2C is a block diagram of a source replication engine that implements a replication interval adjuster, according to one embodiment of the present disclosure.

FIG. 2C is a block diagram of a source replication engine that implements a replication interval adjuster, according to one embodiment. Source replication engine 130 and target replication engine 145 maintain the separation between the data plane and the control plane. All daemons participating in the I/O path communicate through source replication engine 130 and target replication engine 145. In certain embodiments, source replication engine 130 can be configured to maintain, provide, perform, and/or facilitate the following: a persistent replication state and data state as well as state transition logic for individual consistency groups, a single point of contact with a database to persist configuration and state information, validation of requests made by individual daemons for data transfer, and heuristic based QoS to cater to varying priorities of applications.

As shown in FIG. 2C, source replication engine 130 implements replication interval adjuster 135. Replication interval adjuster 135 further implements a workload priority analyzer 220, a recovery point objective (RPO) limit analysis unit 225, an input/output (I/O) rate unit 230, a write cancellation ratio unit 235, a deduplication ratio 240, a compression ratio unit 245, and a workload profile generator 250.

It will be appreciated that each application (e.g., application 160 or application 165) being replicated may have different data transfer needs, and hence a different priority. In some deployments, a WAN link can be a bottleneck, and hence, as previously noted, an expensive and finite resource. Therefore, in one embodiment, replication interval adjuster 135 adjusts replication interval(s) (e.g., on update set(s)) to give preferential treatment to higher priority workloads in an effort to efficiently use the WAN (e.g., network 155). It will also be appreciated that a given data profile varies not only between applications, but also with the time of day (or day of the week) for the same application. Therefore, in some embodiments, replication interval adjuster 135 can factor in such variations along with a given application's priority, and adjust the allotted bandwidth and quota accordingly (e.g., by adjusting the replication interval of a replication operation based on the above considerations).

In certain embodiments, replication interval adjuster 135 uses a heuristic approach using preset parameters such as an application profile (e.g., deduced over the lifetime of replication) and an RPO limit (e.g., preset by a user), among others, assigned to or associated with the application, as well as replication parameters such as I/O rate, write cancellation, compression ratio, and deduplication ratio (among others). As noted, cloud replication can be used to avoid cost(s) associated with application downtime during a disaster. The benefit achieved by using cloud replication varies with the application and is captured in the priority of the (application) workload. For example, benefit can be captured in financial terms (e.g., cost savings in dollars per megabyte (MB) of data protected by using cloud replication). However, RPO specifications (e.g., measured in time) can be different for each application.

An Example of Cloud Replication Based on Adaptive Qos

In one embodiment, replication interval adjuster 135 maximizes $\Sigma\{\{Benefit_i * Data\ In_i)$ minus (WAN Link Cost*Data $Out_i)\}$. In this example, i runs from 1 to the number of consistency groups configured on source gateway 120, Data In and Data Out are expressed in terms of MB, and $\Sigma$ Data $Out_i$ is less than the WAN bandwidth. If WAN link cost can be assumed to be $ 10/MB, the Benefit received can be, for example, $ 100/MB for a Priority 1 application (P1), $ 50/MB for a Priority 2 application (P2), and $ 25/MB for a Priority 3 application (P3). The WAN link cost must be lower than the benefit achieved for any of the applications from using the cloud replication methodology described herein. For example, if the benefit achieved for a Priority 4 application (P4) is $ 10/MB, there is no advantage in using cloud replication for this P4 application because the benefit achieved is equal to the WAN link cost.

In one embodiment, source replication engine 130 monitors a replication stream over a period of time. In this example, the replication stream includes write operations (e.g., replications stream portions 125(1)-(N)) issued by an application (e.g., application 160 or application 165), and is associated with one or more preset parameters. In some embodiments, a preset parameter can include, among other preset parameters, a RPO associated with an application (e.g., identifying the priority level of the application (P1, P2, P3, or P4)).

Source replication engine 130 determines the preset parameters applicable to and associated with the replication stream (or portions thereof) based on workload priority analyzer 220 and RPO limit analysis unit 225. Replication interval adjuster 135, which, as shown in FIG. 2C, is implemented by source replication engine 130, but which, in certain embodiments, can be implemented independently and separately from source replication engine 130, determines replication parameters applicable to the replication stream using I/O rate unit 230, write cancellation ratio unit 235, deduplication ratio unit 240, and compression ratio unit 245. In some embodiments, the replication parameters applicable to the replication stream can be configured by source replication engine 130 to be used in a replication operation. After determining preset parameters and replication parameters, source replication engine 130 stores the preset parameters and the replication parameters (e.g., for use in the replication operation).

In certain embodiments, the replication parameters include an input/output (I/O) rate, a write-cancellation ratio, a deduplication ratio, and/or a compression ratio. Replication interval adjuster 135 performs a replication operation by generating a replication interval by adjusting a replication interval of the replication stream based on the replication parameters, and sends an update set of the replication stream according to the adjusted replication interval (e.g., from source gateway 120 to target gateway 140). In some embodiments, performing the replication operation also includes limiting the adjusted replication interval according to the RPO limit determined as part of identifying the preset parameters. The RPO limit includes an upper limit and a lower limit, and is based on the workload priority assigned to each application.

An I/O rate refers to the amount and the frequency of data that is read or written (e.g., by an application) during a fixed period of time (e.g., 100 mb/s). A write-cancellation ratio refers to the ratio of earlier writes to a given block that are cancelled by fresh writes to the same block. A deduplication ratio refers to the ratio of protected capacity to the actual physical capacity stored. For example, a 10:1 deduplication ratio means that 10 times more data is protected than the physical space required to store the data. Compression ratio refers to the reduction in data-representation size produced, for example, by a data compression methodology. Therefore, compression ratio is defined as the ratio between the uncompressed size and compressed size.

In one embodiment, the replication stream is received from several virtual machines (e.g., virtual machines 110(1)-(N)) via I/O Taps (e.g., I/O trackers 170(1) and 170(2)). The virtual machines execute various applications (e.g., applications 160 and 165), including the application that issues the write operations. Each application is assigned a workload priority (e.g., P1, P2, P3, P4, and the like). In some embodiments, source replication engine 130 accesses a workload profile of a virtual machine, determines the write cancellation ratio and the deduplication ratio of the workload profile, and assigns a weighted average to the workload profile based on the write cancellation ratio and the deduplication ratio.

Cloud replication can be performed by adjusting a replication interval of a replication stream based on preset and replication parameters. For example, if replication is started with a replication interval of 25% of RPO for a P1 application, 50% of RPO for a P2 application, and 75% of RPO for a P3 application, source replication engine 130 initiates frequent data transfers for high priority applications. This process guarantees that the RPO for high priority applications is always met whereas the RPO for low priority applications may or may not be met at all times (e.g., depending on the I/O rate). For instance, if the RPO specification is 16 minutes, at the beginning, the P1 application's data will be sent to the cloud every 4 minutes, whereas data for the P2 application will be sent every 8 minutes, and data for the P3 application will be sent every 12 minutes. In some embodiments, the ideal replication interval is 50% of RPO regardless of the application's priority. In this example, the replication interval can be adjusted by replication interval adjuster 135 based on certain statistics noted in FIG. 3, and the bounds for a replication operation can be between 10% and 90% of the RPO (ensuring that data will be replicated to the cloud at least once within the time limit imposed by the RPO).

FIG. 3 is a replication interval adjustment table, according to one embodiment. Replication interval adjustment table 305 can be maintained by source replication engine 130 (or by replication interval adjuster 135) and stored on source gateway 120, and includes a replication stream portion field 310, a workload priority field 315, an RPO limit field 320, an I/O rate field 325, a write cancellation field 330, a deduplication ratio field 335, a compression ratio field 340, a workload profile field 345, and a replication adjustment field 350.

In one embodiment, if an application workload has a higher I/O rate, replication interval adjuster 135 decreases the replication interval. In addition, by providing an alert at 10% of RPO, source replication engine 130 ensures that the replication interval for a lower priority application will not go below 50% of the application's RPO. For example, and as shown in FIG. 3, source replication engine 130 determines that replication stream portion 125(1) has preset parameters that indicate a workload priority of P1 (e.g., using workload priority analyzer 220) and an RPO limit of 25% (e.g., using RPO limit analysis unit 225). Replication interval adjuster 135 then determines the following replication parameters associated with replication stream portion 125(1): a (higher) I/O rate of 50 mb/s (e.g., using I/O rate analysis unit 230), a write cancellation ratio of 1.25 (e.g., using write cancellation ratio analysis unit 235), a deduplication ratio of 1 (e.g., using deduplication ratio analysis unit 240), and a compression ratio of 1.66 (e.g., using compression ratio analysis unit 245), and determines that replication stream portion 125(1) has a workload profile of A (e.g., using workload profile generator 250). Because these preset and replication parameters (or statistics) are stored, and thus available for use in replication operation(s), replication interval adjuster 135 decreases the replication interval of replication stream portion 125(1), and source replication engine 120 replicates replication stream portion 125(1) to target gateway 140 using the decreased replication interval.

In another embodiment, if an application workload has a higher deduplication ratio, replication interval adjuster 135 increases the replication interval. For example, and as shown in FIG. 3, source replication engine 130 determines that replication stream portion 125(2) has preset parameters that indicate a workload priority of P2 (e.g., using workload priority analyzer 220) and an RPO limit of 50% (e.g., using RPO limit analysis unit 225). Replication interval adjuster 135 then determines the following replication parameters associated with replication stream portion 125(2): an I/O rate of 25 mb/s (e.g., using I/O rate analysis unit 230), a write cancellation ratio of 2.5 (e.g., using write cancellation ratio analysis unit 235), a (higher) deduplication ratio of 2.5 (e.g., using deduplication ratio analysis unit 240), and a compression ratio of 1 (e.g., using compression ratio analysis unit 245), and determines that replication stream portion 125(2) has a workload profile of B (e.g., using workload profile generator 250). Because these preset and replication parameters (or statistics) are stored, and thus available for use in replication operation(s), replication interval adjuster 135 increases the replication interval of replication stream portion 125(2), and source replication engine 120 replicates replication stream portion 125(2) to target gateway 140 using the increased replication interval.

In some embodiments, if an application workload has a higher write cancellation ratio, replication interval adjuster 135 increases the replication interval because if source replication engine 130 waits longer and accumulates more data, less data needs to be sent over the network (e.g., because of write cancellation). For example, and as shown in FIG. 3, source replication engine 130 determines that replication stream portion 125(3) has preset parameters that indicate a workload priority of P3 (e.g., using workload priority analyzer 220) and an RPO limit of 75% (e.g., using RPO limit analysis unit 225). Replication interval adjuster 135 then determines the following replication parameters associated with replication stream portion 125(3): an I/O rate of 10 mb/s (e.g., using I/O rate analysis unit 230), a (higher) write cancellation ratio of 3 (e.g., using write cancellation ratio analysis unit 235), a deduplication ratio of 2.5 (e.g., using deduplication ratio analysis unit 240), and a compression ratio of 0.5 (e.g., using compression ratio analysis unit 245), and determines that replication stream portion 125(3) has a workload profile of B (e.g., using workload profile generator 250). Because these preset and replication parameters (or statistics) are stored, and thus available for use in replication operation(s), replication interval adjuster 135 increases the replication interval of replication stream portion 125(3), and source replication engine 120 replicates replication stream portion 125(3) to target gateway 140 using the increased replication interval.

In other embodiments, if an application workload has a higher write compression ratio, replication interval adjuster 135 decreases the replication interval because, for example, if multiple (low priority) applications are hitting the replication interval at 90% of their RPO, preferential treatment can be given to the application whose data can be compressed before the data is sent over the network. For example, and as shown in FIG. 3, source replication engine 130 determines that replication stream portion 125(N) has preset parameters that indicate a workload priority of P3 (e.g., using workload priority analyzer 220) and an RPO limit of 75% (e.g., using RPO limit analysis unit 225).

Replication interval adjuster 135 then determines the following replication parameters associated with replication stream portion 125(N): an I/O rate of 100 mb/s (e.g., using I/O rate analysis unit 230), a write cancellation ratio of 0.75 (e.g., using write cancellation ratio analysis unit 235), a deduplication ratio of 1 (e.g., using deduplication ratio analysis unit 240), and a (higher) compression ratio of 2.5 (e.g., using compression ratio analysis unit 245), and determines that replication stream portion 125(N) has a workload profile of A (e.g., using workload profile generator 250). Because these preset and replication parameters (or statistics) are stored, and thus available for use in replication operation(s), replication interval adjuster 135 decreases the replication interval of replication stream portion 125(N), and source replication engine 120 replicates replication stream portion 125(N) to target gateway 140 using the decreased replication interval.

It will be appreciated that if there is a conflict between any of the replication parameters discussed above, source replication engine 130 and/or replication interval adjuster 135 can consider all available replication parameters and can calculate or determine a scaled or weighted average for these replication parameters. For example, if a replication stream portion has a write cancellation ratio of 2 versus a deduplication ratio of 1 (e.g., no deduplication), replication interval adjuster 135 can adjust the replication interval based just on the write cancellation ratio of the replication stream portion, and the workload profile of the application that generated the replication stream portion can be dynamically adjusted accordingly.

Processes to Perform Cloud Replication Based on Adaptive QoS

Figure 4:
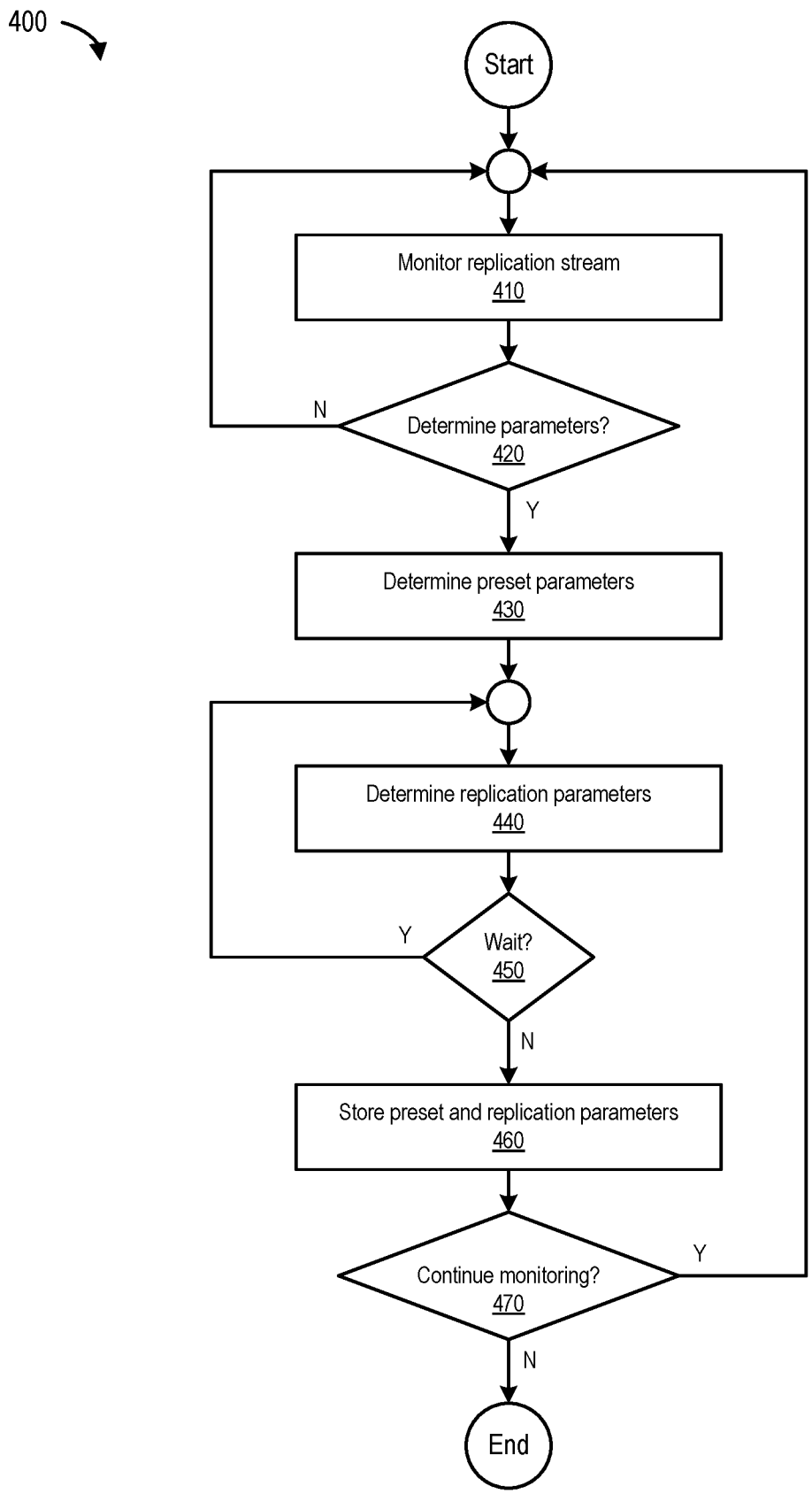
FIG. 4 is a flowchart that illustrates a process for storing preset and replication parameters, according to one embodiment of the present disclosure.

FIG. 4 is a flowchart that illustrates a process for storing preset and replication parameters, according to one embodiment. The process starts at 410 by monitoring a replication stream. At 420, the process determines whether there are any parameters (e.g., of the replication stream) to determine. If there are no parameters to determine, the process loops back to 410. However, if there are parameters to determine, the process at 430, determines preset parameters of the replication stream (e.g., workload priority/RPO limit), and at 440, determines replication parameters of the replication stream (e.g., I/O rate, write cancellation ratio, deduplication ratio, compression ratio, and the like).

At 450, the process determines whether it should wait, for example, to determine if any of the replication parameters have changed (or will change). If waiting is required, the process loops back to 450. If no waiting is required, at 460, the process stores the preset and replication parameters (e.g., to be used in performing replication interval adjusted replication operation(s) to the cloud). At 470, the process determines if continued monitoring of replication stream(s) is required. If so, the process loops back to 410. If not, the process ends.

Figure 5:
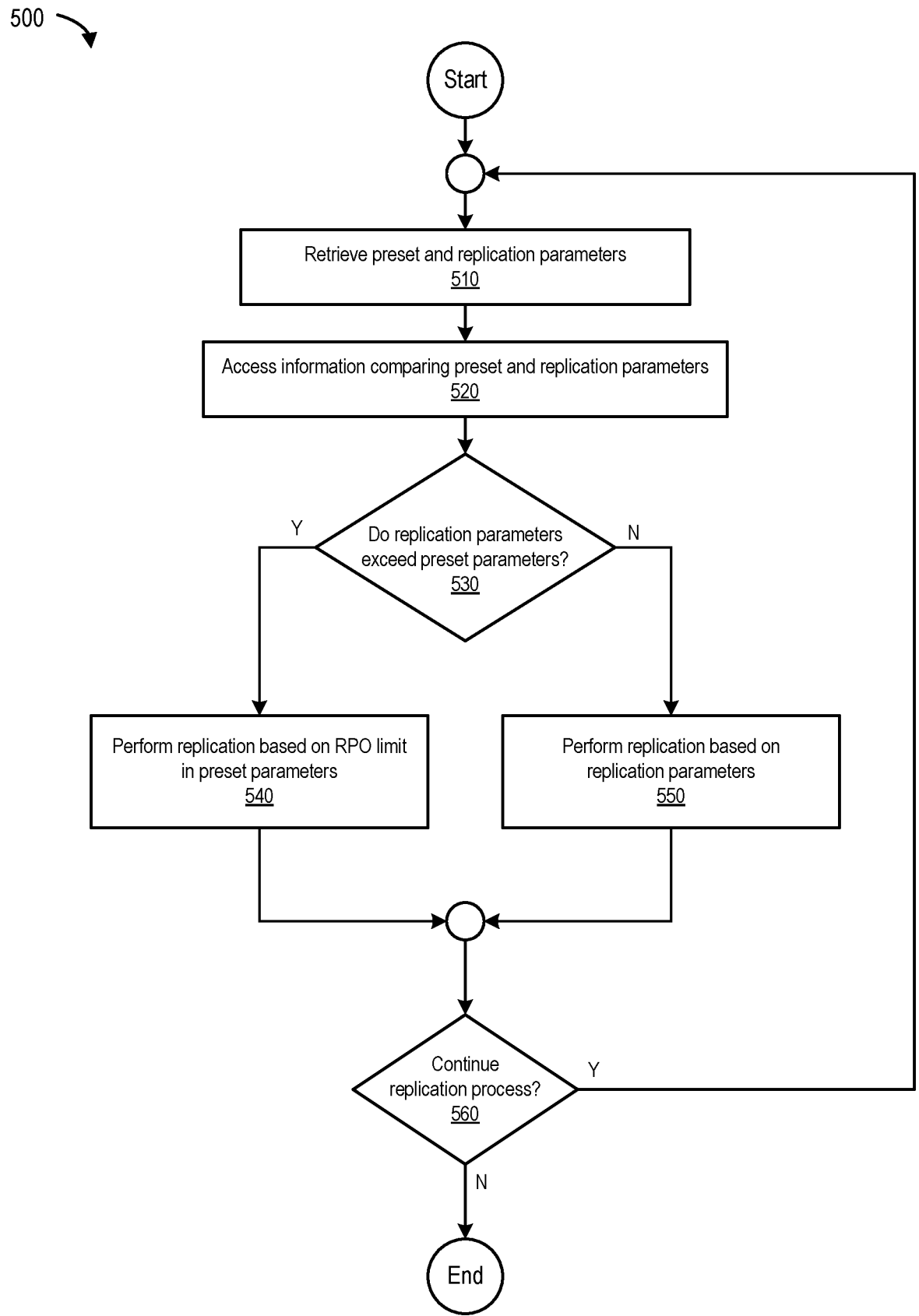
FIG. 5 is a flowchart that illustrates a process for performing replication based on replication parameters, according to one embodiment of the present disclosure.

FIG. 5 is a flowchart that illustrates a process for performing replication based on replication parameters, according to one embodiment. The process begins at 510 by retrieving preset and replication parameters (e.g., stored by source replication engine 130 and/or replication interval adjuster 135). At 520, the process accesses information comparing the preset and the replication parameters. At 530, the process determines if the replication parameters exceed the preset parameters. For example, the process determines whether the replication parameters require replication interval adjustment that would cause a P1 application to not meet its RPO.

If the replication parameters exceed the preset parameters, the process, at 540, performs replication based on an RPO limit (identified) in the preset parameters. However, if the replication parameters do not exceed the preset parameters, the process, at 550, the performs replication based on the replication parameters (e.g., based on I/O rate, write cancellation ratio, deduplication ratio, compression ratio, and the like). At 560, the process determines if the replication process should continue. If so, the process loops to 510. If not, the process ends.

Figure 6:
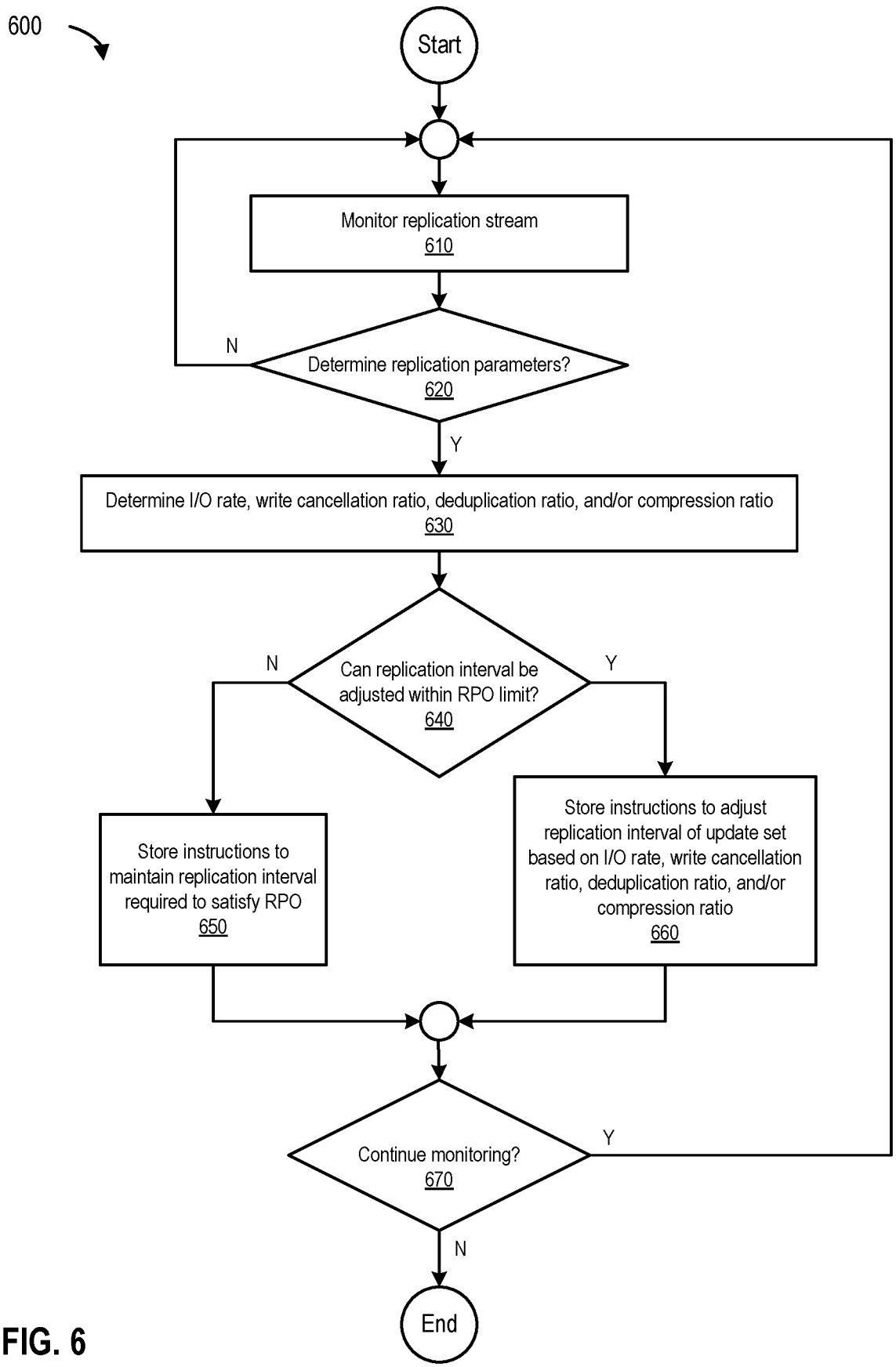
FIG. 6 is a flowchart that illustrates a process for storing instructions to adjust a replication interval of an update set, according to one embodiment of the present disclosure.

FIG. 6 is a flowchart that illustrates a process for storing instructions to adjust a replication interval, according to one embodiment. The process begins at 610 by monitoring a replication stream. At 620, the determines whether replication parameters have to be determined. If replication parameters do not have to be determined, the process loops back to 610. If replication parameters have to be determined, the process, at 630, determines replication parameters, including the I/O rate, the write cancellation ratio, the deduplication ratio, and/or the compression ratio of the replication stream (e.g., using I/O rate unit 230, write cancellation ratio unit 235, deduplication ratio 240, and compression ratio unit 245, respectively), among others.

At 640, the process determines whether the replication interval can be adjusted within the RPO limit. If the replication interval cannot be adjusted within the RPO limit, the process, at 650, stores instructions to maintain the replication interval required to satisfy the RPO. However, if the replication interval can be adjusted within the RPO limit, the process, at 650 stores instruction to adjust the replication interval of an update set based on I/O rate, write cancellation ratio, deduplication ratio, and/or compression ratio. At 670, the process determines if monitoring should be continued. If so, the process loops back to 610. If not, the process ends.

Figure 7:
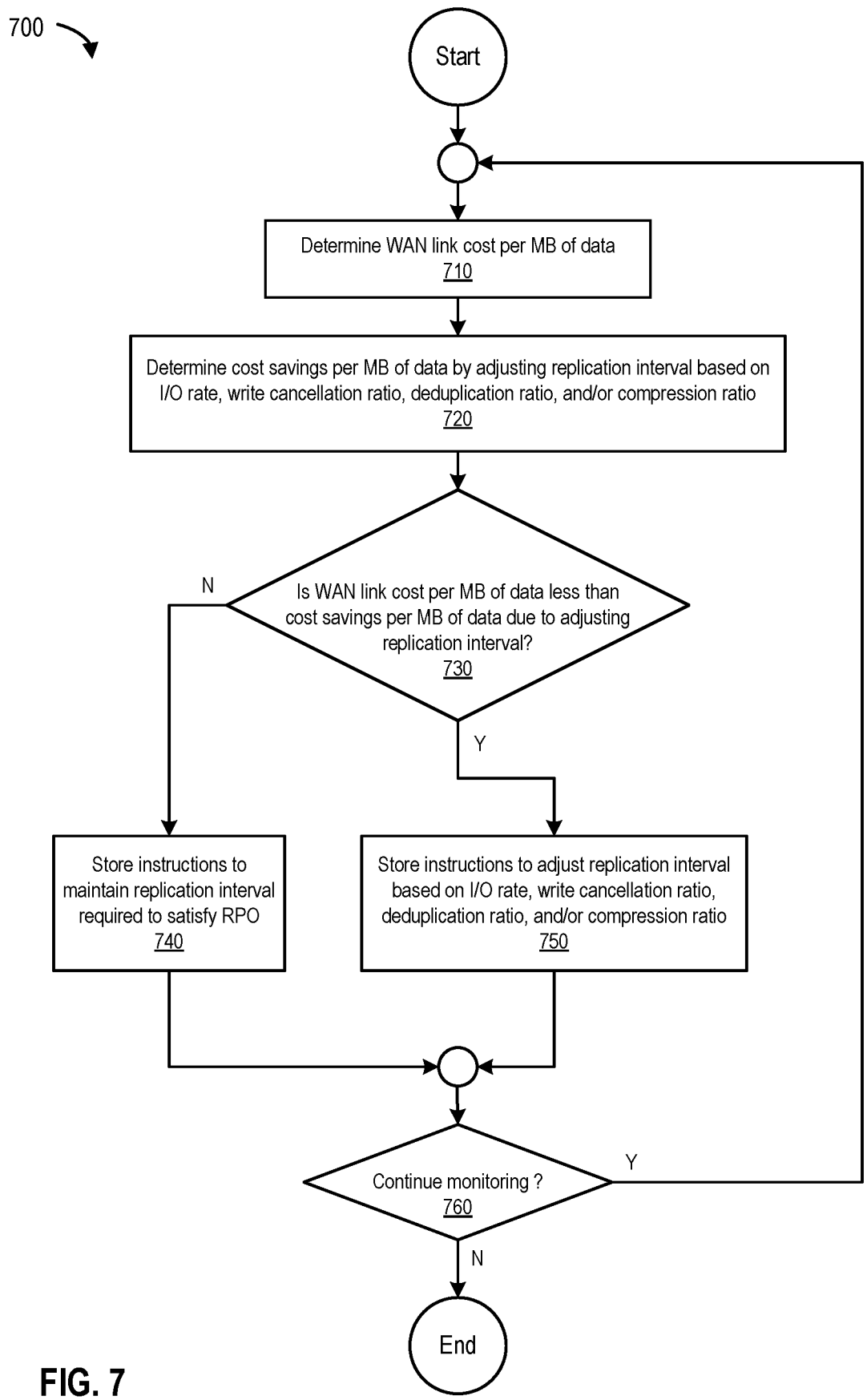
FIG. 7 is a flowchart that illustrates a process for adjusting a replication interval based on WAN link cost, according to one embodiment of the present disclosure.

FIG. 7 is a flowchart that illustrates a process for adjusting a replication interval based on WAN link cost, according to one embodiment. The process begins at 710 by determining the WAN link cost (per MB of data) of implementing a cloud replication operation. At 720 the process determines cost savings (per MB of data) by adjusting a replication interval (e.g., of a replication stream or an update set) based on I/O rate, write cancellation ratio, deduplication ratio, and/or compression ratio.

At 730, the process determines whether the WAN link cost (per MB of data) is less than the cost savings (per MB of data) due to adjusting the replication interval (e.g., based on the foregoing replication parameters). If the WAN link cost is not less than the cost savings, the process, at 740, stores instructions to maintain an (appropriate) replication interval required to satisfy the RPO (e.g., specified in the workload priority/preset parameter(s)). However, if the WAN link cost is less than the cost savings, the process, at 750, stores instructions to adjust the replication interval based on I/O rate, write cancellation ratio, deduplication ratio, and/or compression ratio. At 760, the process determines if continued monitoring is required. If so, the process loops back to 710. If not, the process ends.

It will be appreciated that the methods, systems, and processes described herein can be used to perform cloud-based data replication by providing adaptive quality of service for replication streams based on priority and dynamic application workload profiles.

An Example Computing Environment

Figure 8:
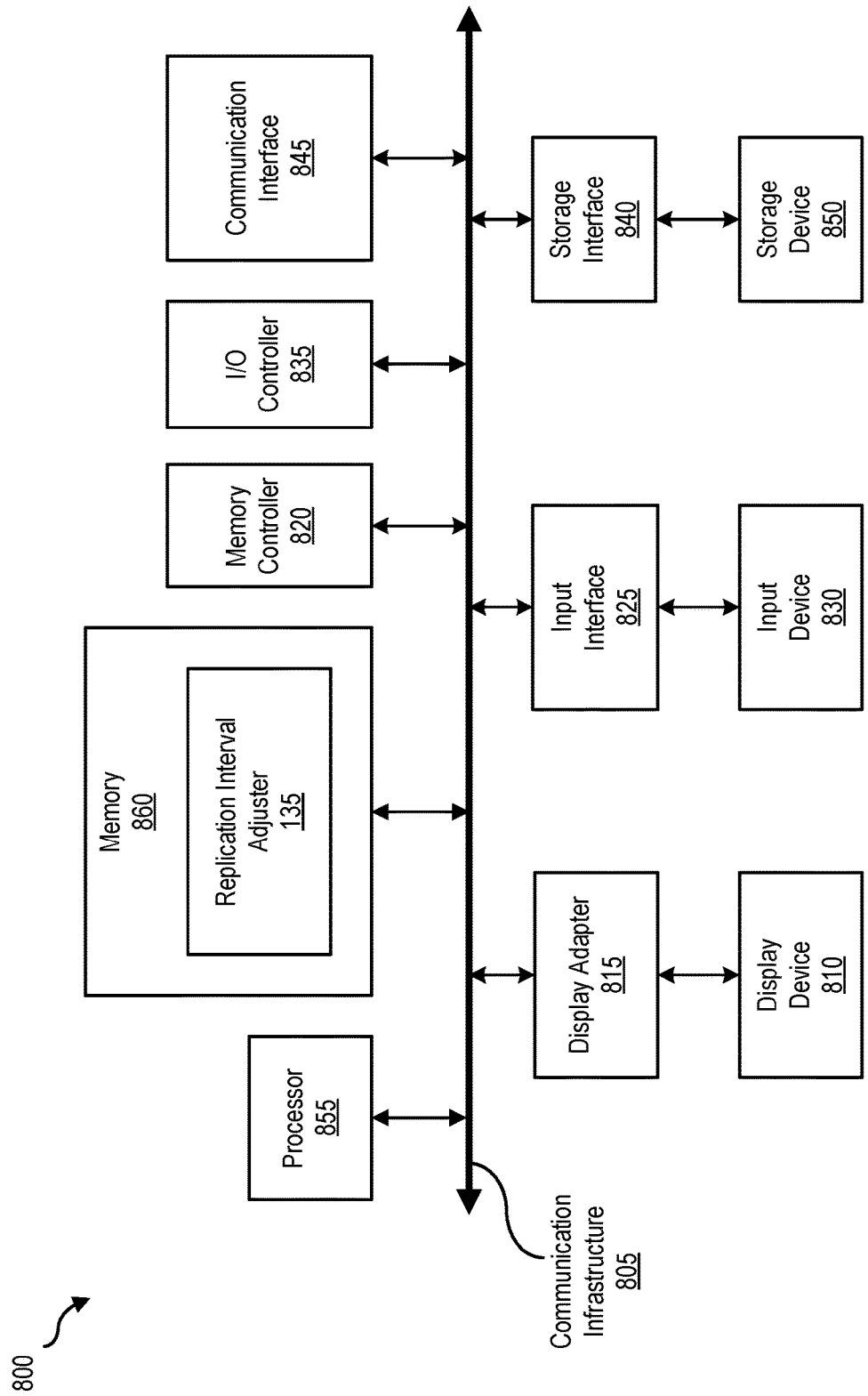
FIG. 8 is a block diagram of a computing system, illustrating how a replication interval adjuster can be implemented in software, according to one embodiment of the present disclosure.

FIG. 8 is a block diagram of a computing system, illustrating how a replication interval adjuster can be implemented in software, according to one embodiment. Computing system 800 broadly represents any single or multiprocessor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that implements source gateway 120, computing system 800 becomes a special purpose computing device that is configured to perform cloud replication based on adaptive QoS.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an orchestrator module may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
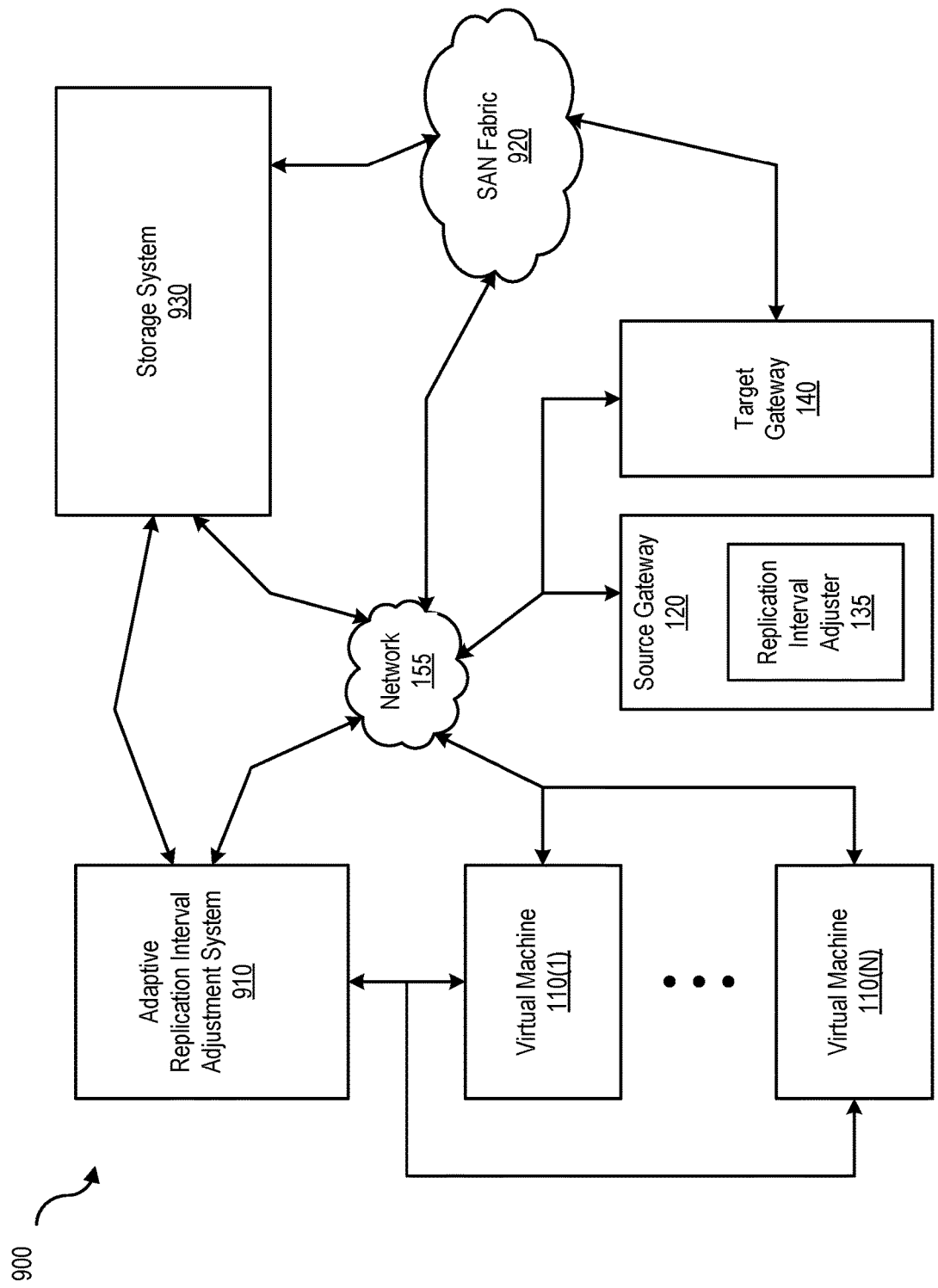
FIG. 9 is a block diagram of a networked system, illustrating how various computing devices can communicate via a network, according to one embodiment of the present disclosure.

FIG. 9 is a block diagram of a networked system, illustrating how various devices can communicate via a network, according to one embodiment. In certain embodiments, network-attached storage (NAS) devices may be configured to communicate with virtual machines 110(1)-(N), source gateway 120, and/or target gateway 140 using various protocols, such as Network File System (NFS), Server Message Block (SMB), or Common Internet File System (CIFS), among others. Network 155 generally represents any type or form of computer network or architecture capable of facilitating communication between source gateway 120 and target gateway 140. In certain embodiments, a communication interface, such as communication interface 845 in FIG. 8, may be used to provide connectivity between source gateway 120, target gateway 140 and network 155. It should be noted that the embodiments described and/or illustrated herein are not limited to the Internet or any particular network-based environment. For example, network 155 can be a Storage Area Network (SAN).

In one embodiment, all or a portion of one or more of the disclosed embodiments may be encoded as a computer program and loaded onto and executed by virtual machines 110(1)-(N), source gateway 120, and/or target gateway 140, or any combination thereof. All or a portion of one or more of the embodiments disclosed herein may also be encoded as a computer program, stored on virtual machines 110(1)-(N), source gateway 120, and/or target gateway 140, and distributed over network 155. In some examples, all or a portion of target gateway 140 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, source gateway 120 may transform the behavior of adaptive replication interval adjustment system 910 and/or source replication engine 130 in order to cause the adaptive replication interval adjustment system 910 and/or source replication engine 130 to perform cloud replication based on adaptive QoS.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   measuring replication parameters of a replication stream, wherein the replication stream comprises write operations issued by a plurality of applications, respectively, and wherein the replication parameters comprise rates at which the plurality of applications, respectively, issue write operations;
   aggregating data of the write operations into update sets corresponding to the plurality of applications, respectively;
   determining a plurality of preset replication intervals assigned to the plurality of applications, respectively;
   generating adjusted replication intervals for the plurality of applications, respectively, by increasing or decreasing replication intervals for the plurality of applications, respectively, based on changes in the rates at which the plurality of applications issue write operations;
   calculating a first cost of replicating the aggregated data for a first application of the plurality of applications, to the target site via a network using a first adjusted replication interval for the first application;
   calculating a second cost of replicating the aggregated data for the first application to the target site via the network using a first preset parameter of the plurality of preset parameters;
   comparing the first and second costs;
   if the first cost exceeds the second cost, replicating the aggregated data for the first application to the target site at the first preset replication interval;

if the second cost exceeds the first cost, replicating the aggregated data for the first application to the target site at the first adjusted replication interval.

2. The method of claim 1 wherein the first and second costs are measured in the same units of currency.

3. The method of claim 1 wherein the first and second costs are calculated using a cost of transmitting data via the network per unit of data.

4. The method of claim 1 wherein the first and second costs of transmitting the aggregated data via the network is calculated per unit of data.

5. The method of claim 1, wherein
the replication stream is received from a plurality of virtual machines via I/O taps,
the plurality of virtual machines execute the plurality of applications, respectively;
each application of the plurality is assigned a workload priority of a plurality of workload priorities.

6. The method of claim 5, wherein the preset replication intervals are based on the workload priorities, respectively, assigned to the plurality of applications, respectively.

7. A non-transitory computer readable storage medium comprising program instructions executable to:
measure replication parameters of a replication stream, wherein the replication stream comprises write operations issued by a plurality of applications, respectively, and wherein the replication parameters comprise rates at which the plurality of applications, respectively, issue write operations;
aggregate data of the write operations into update sets corresponding to the plurality of applications, respectively;
determine a plurality of preset replication intervals assigned to the plurality of applications, respectively;
generate adjusted replication intervals for the plurality of applications, respectively, by increasing or decreasing replication intervals for the plurality of applications, respectively, based on changes in the rates at which the plurality of applications issue write operations;
calculate a first cost of replicating the aggregated data for a first application of the plurality of applications, to the target site via a network using a first adjusted replication interval for the first application;
calculate a second cost of replicating the aggregated data for the first application to the target site via the network using a first preset parameter of the plurality of preset parameters;
compare the first and second costs;
if the first cost exceeds the second cost, replicate the aggregated data for the first application to the target site at the first preset replication interval;
if the second cost exceeds the first cost, replicate the aggregated data for the first application to the target site at the first adjusted replication interval.

8. The non-transitory computer readable storage medium of claim 7, wherein the first and second costs are measured in the same units of currency.

9. The non-transitory computer readable storage medium of claim 7, wherein the cost is calculated based on a cost of transmitting data via the network per unit of data.

10. The non-transitory computer readable storage medium of claim 7, wherein the first and second costs are calculated using a cost of transmitting data via the network per unit of data.

11. A system comprising:
one or more processors; and
a memory coupled to the one or more processors, wherein the memory stores program instructions executable by the one or more processors to:
measure replication parameters of a replication stream, wherein the replication stream comprises write operations issued by a plurality of applications, respectively, and wherein the replication parameters comprise rates at which the plurality of applications, respectively, issue write operations;
aggregate data of the write operations into update sets corresponding to the plurality of applications, respectively;
determine a plurality of preset replication intervals assigned to the plurality of applications, respectively;
generate adjusted replication intervals for the plurality of applications, respectively, by increasing or decreasing replication intervals for the plurality of applications, respectively, based on changes in the rates at which the plurality of applications issue write operations;
calculate a first cost of replicating the aggregated data for a first application of the plurality of applications, to the target site via a network using a first adjusted replication interval for the first application;
calculate a second cost of replicating the aggregated data for the first application to the target site via the network using a first preset parameter of the plurality of preset parameters;
compare the first and second costs;
if the first cost exceeds the second cost, replicate the aggregated data for the first application to the target site at the first preset replication interval;
if the second cost exceeds the first cost, replicate the aggregated data for the first application to the target site at the first adjusted replication interval.

12. The system of claim 11, wherein the first and second costs are measured in the same units of currency.

13. The system of claim 11, wherein the first and second costs are calculated using a cost of transmitting data via the network per unit of data.

* * * * *